(12) United States Patent
Skorina et al.

(10) Patent No.: US 12,071,765 B2
(45) Date of Patent: Aug. 27, 2024

(54) NON-WHITE ROOFING GRANULES AND METHODS OF MAKING SAME

(71) Applicant: 3M INNOVATIVE PROPERTIES COMPANY, St. Paul, MN (US)

(72) Inventors: Taisiya Skorina, Woodbury, MN (US); Kristin M. Amsden, St. Paul, MN (US); Kenton D. Budd, Woodbury, MN (US); Rebecca L. A. Everman, Falcon Heights, MN (US); Jean A. Tangeman, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/028,745

(22) PCT Filed: Sep. 7, 2021

(86) PCT No.: PCT/IB2021/058134
§ 371 (c)(1),
(2) Date: Mar. 27, 2023

(87) PCT Pub. No.: WO2022/074482
PCT Pub. Date: Apr. 14, 2022

(65) Prior Publication Data
US 2023/0332409 A1    Oct. 19, 2023

Related U.S. Application Data

(60) Provisional application No. 63/088,050, filed on Oct. 6, 2020.

(51) Int. Cl.
*E04D 7/00* (2006.01)

(52) U.S. Cl.
CPC ................ *E04D 7/005* (2013.01)

(58) Field of Classification Search
CPC .......... E04D 7/005; C04B 2111/00586; C04B 20/1059; C04B 18/021
See application file for complete search history.

(56) References Cited

U.S. PATENT DOCUMENTS

| 5,273,578 A | 12/1993 | Towe |
| 8,142,531 B2 | 3/2012 | Adefris et al. |

(Continued)

FOREIGN PATENT DOCUMENTS

| DE | 102004008542 A1 | 9/2005 |
| DE | 102010044768 A1 | 3/2012 |

(Continued)

OTHER PUBLICATIONS

International Search Report received for PCT International Application No. PCT/IB2021/058134, mailed on Nov. 2, 2021, 3 pages.

*Primary Examiner* — Nathan L Van Sell

(57) ABSTRACT

A plurality of non-white roofing granules is provided. The roofing granules include a plurality of particles including mineral fines and a calcia-based cement binder; and a non-white pigment-containing coating disposed on at least a portion of exterior surfaces of the particles. Methods of making the roofing granules are also provided. One method includes: mixing material including mineral fines and a calcia-based cement binder to provide agglomerates; curing the agglomerates to provide particles; and coating at least a portion of exterior surfaces of the particles with a non-white pigment-containing coating. Another method of making the roofing granules includes: providing an aqueous dispersion in a tool having cavities, the aqueous dispersion including mineral fines and a calcia-based cement binder; curing the aqueous dispersion in the tool to provide particles; and coating at least a portion of exterior surfaces of the particles with a non-white pigment-containing coating. The roofing (Continued)

2 mm granules exhibit an intrinsic total solar reflectance greater than 0.3. Often, the roofing granules contain by-product mineral fines.

17 Claims, 1 Drawing Sheet

(56) References Cited

U.S. PATENT DOCUMENTS

| | | |
|---|---|---|
| 10,100,521 B2 | 10/2018 | Tangeman et al. |
| 2004/0221515 A1* | 11/2004 | McArdle ................ C04B 35/00 51/308 |
| 2008/0095984 A1 | 4/2008 | Desouto |
| 2008/0241516 A1* | 10/2008 | Hong .................. C04B 20/1074 977/773 |
| 2013/0171414 A1 | 7/2013 | Shiao et al. |
| 2018/0186694 A1 | 7/2018 | Lante et al. |
| 2018/0194684 A1 | 7/2018 | Panzarella et al. |
| 2019/0112227 A1* | 4/2019 | Skorina ................ C04B 14/043 |
| 2019/0144335 A1* | 5/2019 | Skorina .................. C04B 14/28 106/409 |
| 2019/0211560 A1 | 7/2019 | Shiao et al. |
| 2019/0249435 A1 | 8/2019 | Hong et al. |
| 2019/0292788 A1 | 9/2019 | Hong et al. |
| 2019/0305718 A1 | 10/2019 | Peng et al. |
| 2019/0323240 A1 | 10/2019 | Gomes et al. |
| 2020/0080312 A1 | 3/2020 | Li et al. |
| 2020/0087165 A1 | 3/2020 | Russell |

FOREIGN PATENT DOCUMENTS

| | | |
|---|---|---|
| EP | 2132153 B1 | 10/2013 |
| EP | 2268748 B1 | 7/2016 |
| EP | 2844706 B1 | 3/2018 |
| EP | 2813479 B1 | 3/2019 |
| JP | H08-333143 A | 12/1996 |
| WO | 1997017307 A2 | 5/1997 |
| WO | 2008147972 A2 | 12/2008 |
| WO | 2009134461 A2 | 11/2009 |
| WO | 2009145968 A1 | 12/2009 |
| WO | 2014042987 A2 | 3/2014 |
| WO | 2017200843 A1 | 11/2017 |
| WO | 2019207369 A1 | 10/2019 |
| WO | 2019217919 A1 | 11/2019 |
| WO | 2020065498 A1 | 4/2020 |

* cited by examiner

NON-WHITE ROOFING GRANULES AND METHODS OF MAKING SAME

CROSS REFERENCE TO RELATED APPLICATIONS

This application is a national stage filing under 35 U.S.C. 371 of PCT/IB2021/058134, filed Sep. 7, 2021, which claims the benefit of U.S. Application No. 63/088,050, filed Oct. 6, 2020, the disclosure of which is incorporated by reference in its/their entirety herein.

FIELD

The present disclosure relates to roofing granules and methods of making roofing granules.

BACKGROUND

Conventional roofing granules consist of a core baserock of dacite, nepheline syenite, rhyolite, andesite, etc., coated with at least one layer of pigment-containing coating. A typical coating is composed of sodium silicate mixed with raw clay and a pigmenting oxide.

SUMMARY

In a first aspect, a plurality of non-white roofing granules is provided. The non-white roofing granules include a plurality of particles including mineral fines and a calcia-based cement binder; and a non-white pigment-containing coating disposed on at least a portion of exterior surfaces of the plurality of particles.

In a second aspect, a method of making the plurality of non-white roofing granules according to the first aspect is provided. The method includes: mixing material including mineral fines and a calcia-based cement binder to provide agglomerates including the mineral fines and the calcia-based cement binder; curing the agglomerates to provide a plurality of particles; and coating at least a portion of exterior surfaces of the plurality of particles with a non-white pigment-containing coating.

In a third aspect, another method of making the plurality of non-white roofing granules according to the first aspect is provided. The method includes: providing an aqueous dispersion in a tool having a plurality of cavities, the aqueous dispersion including mineral fines and a calcia-based cement binder; curing the aqueous dispersion in the tool to provide a plurality of particles; and coating at least a portion of exterior surfaces of the plurality of particles with a non-white pigment-containing coating.

As an alternative to conventional coated baserock granules, the present disclosure describes synthetic low to moderate cost roofing granules derived from fine mineral powder (e.g., waste fines associated with conventional roofing granules technology) and a calcia-based cement binder. Advantages of embodiments of roofing granules described herein may include enhanced intrinsic solar reflectance, density control, and size/shape control as compared to conventional roofing granules.

DETAILED DESCRIPTION

Figure 1A:
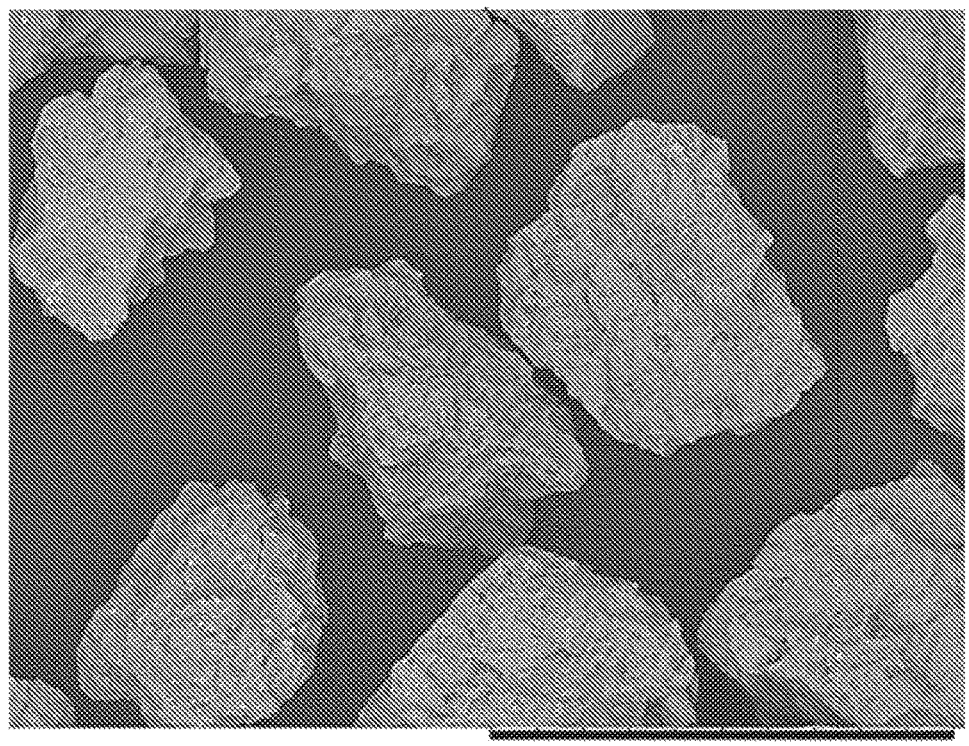
FIG. 1A is a scanning electron microscopy (SEM) image at a magnification of 40× of granules of EX1.
Figure 1B:
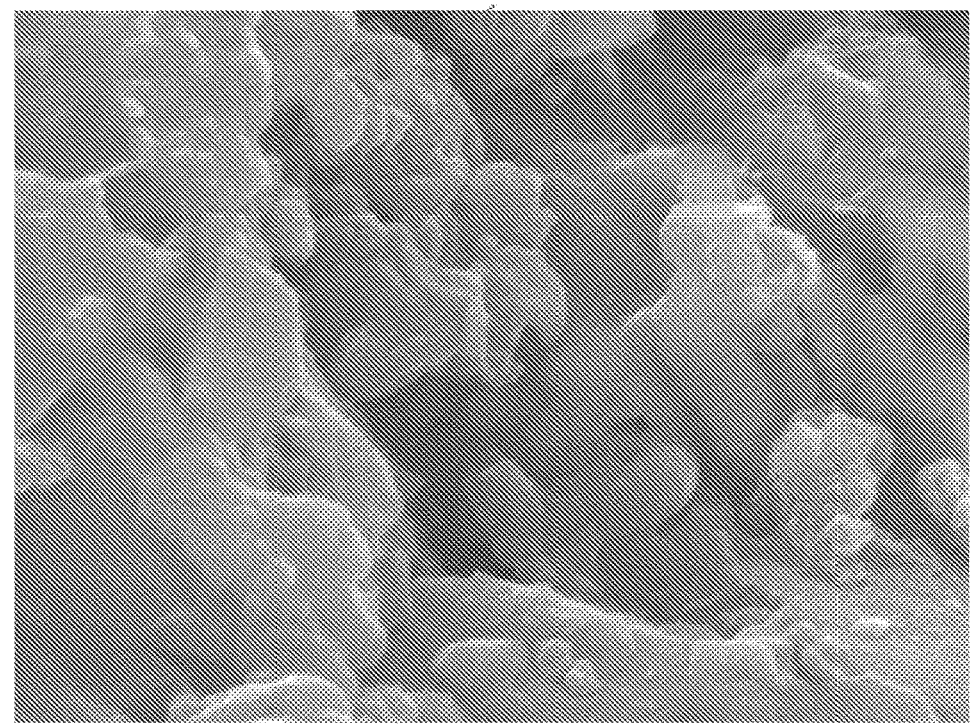
FIG. 1B is an SEM image at a magnification of 37,000× of a granule of EX1.

In this application:

"amorphous" refers to material derived from a melt and/or a vapor phase that lacks any long range crystal structure, as determined by the X-ray diffraction technique described in the Examples;

"binder" refers to a material that holds together mineral fines in a particle;

"cement" refers to a particulate material composed of calcined lime and clay;

"functional additive" refers to a material that substantially changes at least one property (e.g., durability and resistance to weathering) of a roofing granule when present in an amount not greater than 10 percent by weight of the total weight of the roofing granule;

"glass" refers to amorphous material exhibiting a glass transition temperature;

"mineral" refers to a solid inorganic material of natural occurrence;

"mineral fines" refers to a plurality of mineral particles having an average particle size of 100 nanometers to 200 micrometers.

"non-white" refers to a material that absorbs a predetermined wavelength band, peak, or spectrum in the visible spectrum, associated with a predetermined color other than white;

"partially crystallized" refers to material containing a fraction of material characterized by long range order;

"solar-reflective pigment" refers to a pigment that reflects at least a portion of solar energy directed towards the pigment, specifically exhibiting a minimum solar ratio of total solar reflectance (TSR) multiplied by 100 to average total visible diffuse reflectance (e.g., lightness) L* of 0.75 or greater, 0.80, 0.85, 0.90, 0.95, or 1.00 or greater, as determined by measuring each of solar reflectance and L* of a compressed sample of the pigment, i.e., the solar ratio= (TSR×100)/L*=0.75 or greater for a solar-reflective pigment;

"white" refers to a material that scatters light in the visible spectrum such that the material exhibits an appearance of a white color.

In a first aspect, a plurality of non-white roofing granules is provided, comprising:
  a) a plurality of particles comprising mineral fines and a calcia-based cement binder; and
  b) a non-white pigment-containing coating disposed on at least a portion of exterior surfaces of the plurality of particles.

Particles

Particles of the non-white roofing granules according to the present disclosure are composed of at least mineral fines and a calcia-based cement binder. These and other optional components are described in detail below:

Mineral Fines

Broadly, the mineral fines comprise igneous or metamorphic rock. In some embodiments, the mineral fines comprise at least one of nepheline syenite, dacite, rhyolite, andesite, basalt, granite, diabase, or diorite. In some embodiments, the mineral fines comprise nepheline syenite. In some embodiments, the mineral fines comprise dacite. In some embodiments, the mineral fines comprise rhyolite. In some embodiments, the mineral fines comprise andesite. In some embodiments, the mineral fines comprise basalt. In some embodiments, the mineral fines comprise granite. In some embodiments, the mineral fines comprise diabase. In some embodiments, the mineral fines comprise diorite. In some embodiments, waste fines associated with conventional roofing granules technology are advantageously employed, providing a low-cost option for sourcing the mineral fines.

In some embodiments, the mineral fines have average particles sizes in a range from 100 nm to 200 micrometers, 200 nanometers to 100 micrometers, 250 nanometers to 50 micrometers, 500 nm to 2 micrometers, 2 micrometer to 5 micrometers, or even 5 micrometers to 20 micrometers. In some embodiments, the mineral fines have a unimodal distribution of sizes whereas in other embodiments the mineral fines have a multimodal distribution of sizes. In some embodiments, the mineral fines may have one or more broad distribution(s) of particle sizes, while in others it may have one or more narrow distribution(s) of particle sizes. Particle size can be determined using a laser diffraction technique.

Calcia-Based Cement Binder

The calcia-based cement binder contains at most a small amount (e.g., including 0 percent by weight to 2 percent by weight) of alkali silicates, such as cesium silicate, lithium silicate, a potassium silicate, a sodium silicate, or combinations thereof. As such, the calcia-based cement binder is considered "free of alkali silicates". In some embodiments, the calcia-based cement binder comprises one or more calcium silicates, calcium phosphates, calcium aluminates, Portland cement, or a combination thereof. In some embodiments, the cement binder comprises calcium silicates, such as $CaSiO_3$, $Ca_2SiO_4$, or $Ca_3SiO_5$. In some embodiments, the cement binder comprises calcium phosphate, such as $Ca(H_2PO_4)_2$, $Ca_2HPO_4$, or $Ca_3(PO_4)_2$. In some embodiments, the cement binder comprises calcium aluminates, such as $CaO \cdot Al_2O_3$, $CaO \cdot 2Al_2O_3$, $2Ca \cdot Al_2O_3$, $3Ca \cdot Al_2O_3$, $CaO \cdot 6Al_2O_3$, or $12CaO \cdot 7Al_2O_3$. In some embodiments, the cement binder comprises Portland cement, optionally white Portland cement. An exemplary white Portland cement is manufactured by Federal White Cement (Type I, ASTM Designation C-150).

Optional Additives

In certain embodiments, a mixture of binders is employed, such as including a binder than increases the speed of curing. Exemplary (e.g., additive) binders that may be used in combination with the calcia-based cement binder include for instance and without limitation, aluminum phosphate, magnesium phosphate, or combinations thereof. Exemplary organic binders include dextrin and carboxymethylcellulose, which are available, for example, from Dow Chemical Company, Midland, MI.

In some embodiments, the particles further comprise at least one functional additive (e.g., rheology modifier, durability modifier, aqueous stability-improving additive, fluxing agent, curing accelerant, plasticizer, or pigment. Exemplary rheology modifiers include surfactants, which are available, for example, from BYK Additives & Instruments, Geretsried, Germany. Exemplary durability modifiers include aluminosilicates, preferably metakaolin and/or amorphous silica microparticles (e.g., pyrogenic ("fumed") silica), nanosilica, and silica fume. Amorphous silica particles are available, for example, from Evonik Industries, Essen, Germany. Exemplary aqueous stability-improving additives include calcium hydroxide. In some embodiments, each of the plurality of particles comprises 0.1 to 10 percent by weight of at least one rheology, durability and/or aqueous stability-improving additive, based on the total weight of each particle. Exemplary curing accelerants include calcium nitrate, calcium nitrite, calcium formate, and calcium chloride. Exemplary plasticizers include, for example, SIKA VISCOCRETE-1000, -2100, -2110, -4100, or -6100, SIKAMENT-475, -610, OR-686, and SIKAMENT SPMN, all of which are available, from Sika Corporation, Lyndhurst, NJ.

Exemplary hardeners include an aluminum phosphate, an aluminosilicate, a cryolite, and a calcium salt (e.g., $CaCl_2$). In some embodiments the exemplary hardeners may include zinc borate. In some embodiments, the hardener is amorphous. Exemplary hardeners are commercially available, for example, from commercial sources such as Budenheim Inc., Budenheim, Germany, and Solvay Fluorides, LLC, Houston, TX. In some embodiments, the ratio of calcia-based cement binder to hardener is in a range of 20:1 to 2:1.

Exemplary pigments include those described below with respect to the solar-reflective pigment-containing coating and may be employed to improve at least one of solar reflectivity or ultraviolet (UV) light blocking, as well as optionally impart color to the particles. Other pigments, for instance, titanium dioxide (titania) may be used as a pigment within the particles, and its strongly scattering characteristics provide both improved solar reflectivity and UV light blocking. Exemplary pigments for use in the coating include those available from the Shepherd Color Company, Cincinnati, OH, under the trade designations "BROWN 10P857", BROWN 30C888, and BROWN 10P850, and those available from the Ferro Corporation Mayfield Heights, OH, under the trade designations "V-9248 BLUE," "V-9250 BRIGHT BLUE," and "F-5686 TURQUOISE."

Roofing Granules

In addition to the particles, the roofing granules comprise a non-white pigment-containing coating attached to a portion of the exterior surfaces of the particles. Typically, the solar-reflective pigment-containing coating is disposed on greater than 50%, 55% or greater, 60% or greater, 65% or greater, 70% or greater, 75% or greater, or 80% or greater, of the exterior surfaces of the plurality of particles.

In some embodiments, the non-white pigment-containing coating comprises sodium silicate, a clay, and a pigmenting oxide. In preferred embodiments, the non-white pigment is a solar-reflective pigment. Exemplary pigments for use in the coating include those available from the Shepherd Color Company, Cincinnati, OH, under the trade designations "BLACK 30C940", "BLACK 10C912", BROWN 10P895, "GREEN 10C650", and those available from the Ferro Corporation Mayfield Heights, OH, under the trade designations "10201 ECLIPSE BLACK", V-7750 COOL COLORS IR BLACK, "YELLOW 10415", 10415 BROWN".

A majority of the volume of non-white roofing granules is typically formed of the particles while a minority of the volume is formed of the non-white pigment-containing coating. For instance, in some embodiments, the particles (i.e., without a coating) tend to comprise particle sizes in a range from 90 micrometers to 4.9 millimeters. After coating, the non-white roofing granules may have particle sizes in a range from 100 micrometers to 5 millimeters. Stated another way, the non-white roofing granules may have particle sizes of 100 micrometers or greater, 200, 300, 400, 500, 600, 700, 800, 900, 1 millimeter, 1.25, 1.5, 1.75, 2.0, or 2.25 millimeters or greater; and 5 millimeters or less, 4.75, 4.5, 4.25, 4, 3.75, 3.5, 3.25, 3, 2.75, or 2.5 millimeters or less.

Often, at least a portion of the plurality of non-white roofing granules are free of any coating that comprises titania. Advantageously, roofing granules lacking titania ($TiO_2$) in a coating on their exterior surfaces according to at least certain embodiments of the present disclosure exhibit an average total visible diffuse reflectance (e.g., lightness), L*, of CIELAB color scale L*a*b* comparable to conventional roofing granules that do have a coating containing titania. This is believed to be due to the controlled porosity and each of the sub-micrometer-scale features and micrometer-scale features of the present roofing granules. As mentioned above, in some embodiments, a pigment, such as titania, may also be included within the particles of the roofing granules.

Typically, due to the color from the non-white pigment, the non-white roofing granules exhibit an average total visible diffuse reflectance (L*) of 65 or less, 60 or less, 55 or less, 50 or less or 45 or less, or 40 or less. In some embodiments, the non-white roofing granules exhibit a L* of 15 or greater, 20 or greater, 25 or greater, 30 or greater, 35 or greater. Total visible diffuse reflectance may be measured using a colorimeter (available under the trade designation "LABSCAN" from HunterLab, Reston, VA), and ranges from 0 to 100.

In many embodiments, the non-white roofing granules exhibit an intrinsic total solar reflectance (TSR) of 0.15 or greater, 0.20 or greater, 0.25 or greater, 0.30 or greater, or 0.35 or greater; and 0.60 or less, 0.55 or less, 0.50 or less, 0.45 or less, or 0.40 or less. TSR ranges from 0.00 to 1.00. Solar reflectivity of granules is measured using a spectrum reflectometer (available as Model SSR-ER v6 from Devices and Services Co., Dallas, TX) using a 1.5E air mass setting. For "Cup" measurements, granules were loaded into a sample holder with a depth of about 5 mm, then the surface of the granules is leveled using a roller.

It is an advantage of at least certain non-white roofing granules according to the present disclosure to exhibit both an average L* of less than 60 and a TSR of greater than 0.30.

In some embodiments, each non-white roofing granule comprises 50 percent by weight or more of the mineral fines, based on the total weight of each non-white roofing granule, (in some embodiments 52, 55, 57, 60, 62, or 65 percent by weight or more); and 80 percent by weight or less, based on the total weight of each non-white roofing granule, (in some embodiments 78, 75, 72, 70, or 67 percent by weight or less). Stated another way, each non-white roofing granule may comprise 50 to 80 percent by weight of the mineral fines, based on the total weight of each non-white roofing granule. Relative sizes of the mineral fines to the roofing granules can be described. In some embodiments, the mineral fines have an average longest dimension, the non-white roofing granules have an average longest dimension, and the average longest dimension of the mineral fines is no greater than 20% of the average longest dimension of the non-white roofing granules. Accordingly, a plurality of mineral fines is present in each roofing granule.

In some embodiments, each non-white roofing granule comprises 5 percent by weight or more of the calcia-based cement binder, based on the total weight of each non-white roofing granule, (in some embodiments 7, 10, 12, 15, 17, 20, 22, or 25 percent by weight or more); and 40 percent by weight or less of the calcia-based cement binder, based on the total weight of each non-white roofing granule, (in some embodiments, 38, 35, 32, 30, 28, or 26 percent by weight or less). Practically, a plurality of granules would be analyzed to determine the calcia-based cement binder content.

Typically, each non-white roofing granule comprises at least 80 percent by weight collectively of the mineral fines and the calcia-based cement binder, based on the total weight of each non-white roofing granule, such as 80 percent by weight or more (in some embodiments 82, 84, 86, 88, or 90 percent by weight or more). Stated another way, in some embodiments, each non-white roofing granule comprises 20 weight percent or less of all optional additives and coating, based on the total weight of each roofing granule (in some embodiments 18, 16, 14, 12, or 10 percent by weight or less).

For instance, when one or more additive, non calcia-based cement, binders are employed in the particles, the (e.g., supplemental) binders may be present in each non-white roofing granule an amount of 0.1 percent by weight to 5 percent by weight, based on the total weight of the non-white roofing granule.

In some embodiments, the plurality of non-white roofing granules has an average total through pore volume in a range from 0.1 cubic centimeter per gram (cc/g) or more (in some embodiments 0.12, 0.15, 0.20, or 0.25 cc/g or more); and 0.40 cc/g or less (in some embodiments 0.35, 0.30, or 0.27 cc/g or less). Total pore volume may be determined as follows. Density is determined by weighing a sample of granules and then measuring the volume of the granules by combining them with a known volume of a non-wetting liquid or wax. The volume of granules is the total volume minus the volume of liquid or wax. In some embodiments, the granules have a density in a range from 0.5 grams per cubic centimeter ($g/cm^3$) to 3 $g/cm^3$. Pore volume is then determined by comparing the granule density to the solid phase density. The solid phase density can be determined by helium pycnometry.

The roofing granules may be in any of a variety of shapes, including cubes, truncated cubes, pyramids, truncated pyramids, triangles, tetrahedras, spheres, hemispheres, and cones. In some embodiments, a granule can have a first face and a second face separated by a thickness. In some embodiments, such granules further comprise at least one of a straight or sloping wall.

In some embodiments, granules described herein have a tumble toughness value after immersion in water for two months at 20° C.±2° C. of at least 40, 45, 50, 55, 60, 65, 70, 75, 80, 85 or even at least 90.

Embodiments of granules described herein can be made by a variety of methods. For example, one method comprises:
   mixing material comprising mineral fines and a calcia-based cement binder to provide agglomerates comprising the mineral fines and the calcia-based cement binder;
   curing the agglomerates to provide a plurality of particles; and
   coating at least a portion of exterior surfaces of the plurality of particles with a non-white pigment-containing coating.

The material can be mixed using techniques known in the art for agglomerating material. Typically, a liquid such as water is introduced (periodically or continually) to aid in the agglomerating the material.

In some embodiments, the material is an aqueous dispersion, which can be made using techniques known in the art. In some embodiments, water is present in up to 75, 70, 65, 60, 55, 50, 45, 40, 35, 30, 25, 20, or even up to 15 (in some embodiments; in a range from 15 to 75, 15 to 50, or even 15 to 35) percent by weight, based on the total weight of the aqueous dispersion.

Curing can be done by techniques known in the art including heating the material to be cured in an oven. In some embodiments, the curing is conducted at least in part at a temperature at a range from 40° C. to 300° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part in a range from 20° C. to 100° C., and a second, final curing stage at least in part at a temperature in the range 200° C. to 400° C. In some embodiments, the heating rate for each stage is at one or more rates in a range from 5° C./min. to 50° C./min. The selection of the heating rate(s) and temperature(s) may be influenced by the composition and/or size of the materials being cured.

The dispersion can be prepared using techniques in the art. In some embodiments, water is present in the aqueous dispersion up to 75, 70, 65, 60, 55, 50, 45, 40, 35, 30, 25, 20, or even up to 15 (in some embodiments, in a range from 15 to 75, 15 to 50, or even 15 to 35) percent by weight, based on the total weight of the aqueous dispersion.

The agglomerates can be cured by techniques known in the art including curing in a batch oven or continuous rotary furnace. In some embodiments, the curing is conducted at least in part at a temperature in a range from 40° C. to 300° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part in a range from 20° C. to 100° C., and a second, final curing stage at least in part at a temperature in the range 200° C. to 400° C. In some embodiments, the heating rate for each stage is at one or more rates in a range from 5° C./min. to 50° C./min. The selection of the heating rate(s) and temperature(s) may be influenced by the composition and/or size of the materials being cured.

A non-white pigment-containing coating composition can be prepared in any suitable manner. In one embodiment, the method comprises combining an inorganic binder precursor (e.g. alkali silicate solution) with a chemical curing agent (e.g. metakaolin) and homogenizing in a laboratory impeller mixer. The method further comprises adding the non-white pigment particles to the slurry and vigorously stirring (e.g., at 1000 rpm for 10 minutes). Finally, the method comprises adding any the other powdered components and stirring vigorously (e.g. for 20-25 minutes in total). In an alternative method, dry alkali silicate may be used instead of alkali silicate solution. This method comprises combining the alkali silicate powder with the other powdered components (e.g. non-white pigment, chemical curing agent, inorganic particulate filler having a refractive index of less than 1.70) and homogenizing by co-milling or any other technique that achieves high homogeneity. The method further comprises combining the co-milled mixture of particles with an aqueous liquid. The coated roofing granules are typically dried and cured at temperatures above 20° C., and preferably at temperatures of 40-70° C. In some embodiments, two, three, or even more coatings may need to be applied to provide a minimum desired coverage. Optionally, after coating the roofing granules, the roofing granules may be fired, preferably at temperatures of 200° C. to 500° C. Fired alkali coating compositions, as described herein, may be characterized as "sintered" or "calcined".

A second method comprises:
providing an aqueous dispersion in a tool comprising a plurality of cavities, the aqueous dispersion comprising mineral fines and a calcia-based cement binder;
curing the aqueous dispersion in the tool to provide a plurality of particles; and
coating at least a portion of exterior surfaces of the plurality of particles with a non-white pigment-containing coating.

The dispersion can be prepared using techniques in the art. In some embodiments, water is present in the aqueous dispersion up 75, 70, 65, 60, 55, 50, 45, 40, 35, 30, 25, 20, or even up to 15 (in some embodiments; in a range from 15 to 75, 15 to 50, or even 15 to 35) percent by weight, based on the total weight of the aqueous dispersion.

The tool can be a mold having at least one mold cavity, more typically a plurality of cavities. The cavity can be configured to have the desired three-dimensional shape. In one exemplary embodiment, the shape of a cavity can be described as being a triangle as viewed from the top. Other exemplary cavity shapes include circles, rectangles, squares, hexagons, stars, etc., to provide shapes such as cubes, truncated cubes, pyramids, truncated pyramids, triangles, tetrahedras, spheres, hemispheres, cones and combinations thereof. The shapes typically have a substantially uniform depth dimension. Such molds can be made using techniques known in the art, including that reported in U.S. Pat. No. 8,142,531 (Adefris et al.), the disclosure of which is incorporated herein by reference.

Curing can be conducted using techniques known in the art including heating the tool with the dispersion in the cavities in an oven. In some embodiments, the curing is conducted at least in part at a temperature in a range from 40° C. to 300° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part in a range from 20° C. to 100° C., and a second, final curing stage at least in part at a temperature in the range 200° C. to 400° C. In some embodiments, the heating rate for each stage is at one or more rates in a range from 5° C./min. to 50° C./min. The selection of the heating rate(s) and temperature(s) may be influenced by the composition and/or size of the materials being cured.

In alternative methods, one or more blocks of material may be formed instead of individual particles, and then may be crushed to form particles prior to coating. Techniques for crushing and screening to provide the desired size and particle size distribution of particles for roofing granules are known in the art.

Advantageous embodiments of non-white roofing granules described herein may include enhanced solar reflectance, density control, and size/shape control as compared to conventional roofing granules.

Various exemplary embodiments are provided of non-white roofing granules and methods of making non-which roofing granules:

In a first embodiment, the present disclosure provides a plurality of non-white roofing granules comprising: a) a plurality of particles comprising mineral fines and a calcia-based cement binder; and b) a non-white pigment-containing coating disposed on at least a portion of exterior surfaces of the plurality of particles.

In a second embodiment, the present disclosure provides a plurality of non-white roofing granules according to the first embodiment, wherein the non-white pigment-containing coating is disposed on greater than 50% of the exterior surfaces of the plurality of particles.

In a third embodiment, the present disclosure provides a plurality of non-white roofing granules according to the first embodiment or the second embodiment, wherein the calcia-based cement binder comprises a calcium silicate, a calcium phosphate, a calcium aluminate, Portland cement, or a combination thereof.

In a fourth embodiment, the present disclosure provides a plurality of non-white roofing granules according to any of the first through third embodiments, wherein the calcia-based cement binder comprises Portland cement.

In a fifth embodiment, the present disclosure provides a plurality of non-white roofing granules according to any of the first through fourth embodiments, wherein the mineral fines comprise igneous or metamorphic rock.

In a sixth embodiment, the present disclosure provides a plurality of non-white roofing granules according to any of the first through fifth embodiments, wherein the mineral fines comprise at least one of nepheline syenite, dacite, rhyolite, andesite, basalt, granite, diabase, or diorite.

In a seventh embodiment, the present disclosure provides a plurality of non-white roofing granules according to any of the first through sixth embodiments, wherein the non-white pigment-containing coating comprises sodium silicate, a clay, and a pigmenting oxide.

In an eighth embodiment, the present disclosure provides a plurality of non-white roofing granules according to any of the first through seventh embodiments, wherein at least a portion of the plurality of non-white roofing granules are free of any coating that comprises titania.

In a ninth embodiment, the present disclosure provides a plurality of non-white roofing granules according to any of the first through eighth embodiments, wherein each non-white roofing granule comprises 50 to 80 percent by weight of the mineral fines, based on the total weight of each non-white roofing granule.

In a tenth embodiment, the present disclosure provides a plurality of non-white roofing granules according to any of the first through ninth embodiments, wherein each non-white roofing granule comprises 5 to 40 percent by weight of the calcia-based cement binder, based on the total weight of each non-white roofing granule.

In an eleventh embodiment, the present disclosure provides a plurality of non-white roofing granules according to any of the first through tenth embodiments, wherein each non-white roofing granule collectively comprises at least 80 percent by weight collectively of the mineral fines and the calcia-based cement binder.

In a twelfth embodiment, the present disclosure provides a plurality of non-white roofing granules according to any of the first through eleventh embodiments, wherein each of the plurality of particles further comprises a plasticizer.

In a thirteenth embodiment, the present disclosure provides a plurality of non-white roofing granules according to any of the first through twelfth embodiments, wherein each of the plurality of particles further comprises a pigment disposed within the particle.

In a fourteenth embodiment, the present disclosure provides a plurality of non-white roofing granules according to any of the first through thirteenth embodiments, wherein each of the plurality of particles further comprises 0.1 to 10 percent by weight of at least one rheology, durability- and/or aqueous stability-improving additive, based on the total weight of each particle.

In a fifteenth embodiment, the present disclosure provides a plurality of non-white roofing granules according to the fourteenth embodiment, wherein the durability and/or rheology modifying additive is present and comprises an aluminosilicate.

In a sixteenth embodiment, the present disclosure provides a plurality of non-white roofing granules according to any of the first through fifteenth embodiments, exhibiting an intrinsic total solar reflectance (TSR) of 0.15 or greater, 0.20 or greater, 0.25 or greater, 0.30 or greater, or 0.35 or greater; and 0.60 or less, 0.55 or less, 0.50 or less, 0.45 or less, or 0.40 or less.

In a seventeenth embodiment, the present disclosure provides a plurality of non-white roofing granules according to any of the first through sixteenth embodiments, wherein the plurality of non-white roofing granules has an average total pore volume in a range from 0.10 cubic centimeter per gram (cc/g) to 0.40 cc/g.

In an eighteenth embodiment, the present disclosure provides a plurality of non-white roofing granules according to any of the first through seventeenth embodiments, exhibiting an average total visible diffuse reflectance (L*) of 65 or less, 60 or less, 55 or less, 50 or less or 45 or less, or 40 or less.

In a nineteenth embodiment, the present disclosure provides a plurality of non-white roofing granules according to any of the first through eighteenth embodiments, exhibiting an average total diffuse reflectance (L*) of less than 60 (in some embodiments, 50 or less or 40 or less) and an intrinsic total solar reflectance (TSR) of greater than 0.30.

In a twentieth embodiment, the present disclosure provides a plurality of non-white roofing granules according to any of the first through nineteenth embodiments, having particle sizes in a range from 100 micrometers to 5 millimeters.

In a twenty-first embodiment, the present disclosure provides a plurality of non-white roofing granules according to any of the first through twentieth embodiments, wherein the particles comprise particle sizes in a range from 90 micrometers to 4.9 millimeters.

In a twenty-second embodiment, the present disclosure provides a plurality of non-white roofing granules according to any of the first through twenty-first embodiments, wherein the mineral fines have an average longest dimension, wherein the non-white roofing granules have an average longest dimension, and wherein the average longest dimension of the mineral fines is no greater than 20% of the average longest dimension of the non-white roofing granules.

In a twenty-third embodiment, the present disclosure provides a plurality of non-white roofing granules according to any of the first through twenty-second embodiments, wherein each of the plurality of particles further comprises a curing accelerant.

In a twenty-fourth embodiment, the present disclosure provides a plurality of non-white roofing granules according to any of the first through twenty-third embodiments, wherein the non-white pigment-containing coating comprises a solar-reflective pigment.

In a twenty-fifth embodiment, the present disclosure provides a method of making a plurality of non-white roofing granules according to any of the first through twenty-fourth embodiments. The method comprises: mixing material comprising mineral fines and a calcia-based cement binder to provide agglomerates comprising the mineral fines and the calcia-based cement binder; curing the agglomerates to provide a plurality of particles; and coating at least a portion of exterior surfaces of the plurality of particles with a non-white pigment-containing coating.

In a twenty-sixth embodiment, the present disclosure provides a method of making a plurality of non-white roofing granules according to any of the first through twenty-fourth embodiments. The method comprises: providing an aqueous dispersion in a tool comprising a plurality of cavities, the aqueous dispersion comprising mineral fines and a calcia-based cement binder; curing the aqueous dispersion in the tool to provide a plurality of particles; and coating at least a portion of exterior surfaces of the plurality of particles with a non-white pigment-containing coating.

Advantages and embodiments of this invention are further illustrated by the following examples, but the particular materials and amounts thereof recited in these examples, as well as other conditions and details, should not be construed to unduly limit this invention.

Unless otherwise noted or readily apparent from the context, all parts, percentages, ratios, etc. in the Examples and the rest of the specification are by weight. All materials are commercially available, for example from Sigma-Aldrich Chemical Company, Milwaukee, WI, USA, or known to those skilled in the art, unless otherwise stated or apparent.

The following abbreviations are used in this section: L=Liters, mL=milliliters, g=grams, m=meters, mm=millimeters, μm=micrometers, wt. %=percent by weight, d=days, p=partial pressure, cc=cubic centimeters, nm=nanometers, °C.=degrees Celsius, SSA=specific surface area, TSR=total solar reflectance, $D_{50}$=particle size at 50% in the cumulative distribution of the particles, $D_{90}$=particle size at 90% in the cumulative distribution of the particles, K=Kelvin. Abbreviations for materials used in this section, as well as descriptions of the materials, are provided in Table 1.

EXAMPLES

TABLE 1

Materials Used in the Examples

| Abbreviation | Description and Source |
|---|---|
| BG8 | Dacite mineral fines, $D_{50}$ = 5 μm, $D_{90}$ = 15 μm |
| BG8, 150-300 microns cut | Dacite mineral fines, 150-300 microns cut, $D_{50}$ = 220 μm |
| White Portland Cement | Available under the trade designation WHITE PORTLAND CEMENT TYPE I from Federal White Cement, Woodstock, Ontario, Canada |
| Ca(OH)$_2$ | Available from Sigma Aldrich |
| Aerosil 200 | Hydrophilic fumed silica obtained under the trade designation AEROSIL 200 from Evonic Industries AG, Essen, Germany |
| Kaolinite RP2 | Air float kaolin obtained under the trade designation ACTI-MIN RP-2 from Active Minerals International, Sparks, MD |
| Viscocrete 2100 | High range water reducing and superplasticizing admixture obtained under the trade designation VISCOCRETE 2100 from Sika, Lyndhurst, NJ |
| Sodium Silicate | Sodium silicate aqueous solution obtained under the trade designation "PD" from PQ Corporation Valley Forge, PA 19482 |
| BROWN 10550 | Brown pigment available under the trade designation, "10415 BROWN," from Ferro Corporation |
| YELLOW 10415 | Yellow pigment available under the trade designation, "10550 YELLOW," from Ferro Corporation, Mayfield Heights, OH |
| RED V13810 | Red pigment available under the trade designation, "V13810 RED," from Ferro Corporation |
| Shepherd 30C940 | Black pigment obtained under the trade designation "BLACK 30C940" from The Shepherd Color Company, Cincinnati, OH |

TABLE 1-continued

Materials Used in the Examples

| Abbreviation | Description and Source |
|---|---|
| 6580 | Buff colored cool roofing granule available under the trade designation 3M COOL ROOFING GRANULES 6580C from 3M Company, St. Paul, MN |
| 4980 | Buff colored cool roofing granule available under the trade designation 3M COOL ROOFING GRANULES 4980C from 3M Company, St. Paul, MN |
| Grade #11 | Grade #11 uncoated roofing granules (quartz lattite/dacite porphyry) available from 3M Company, specified by the following ranges (as per ASTM D451): |

| U.S. Sieve Range | Weight Percent of material |
|---|---|
| +8M | 0-0.1 |
| −8 + 12 | 4-10 |
| −12 + 16 | 30-50 |
| −16 + 20 | 20-40 |
| −20 + 30 | 10-30 |
| −30 + 40 | 1-10 |
| −40M | 0-2 |

Test Methods

Particle Size Distribution

Particle size distributions of the dacite fines were measured by laser diffraction using Horiba LA-950V/LA-950V2 (Horiba, Kyoto, Japan). Dispersions of dacite fines in water were diluted to approximately 1 weight percent solids with water. The diluted sample was then added to the measurement cell which was filled with water until the transmittance was between the recommended levels of 85-95%.

Surface Specific Area (SSA)

The Brunauer, Emmett and Teller (BET) surface area of granules was determined by $N_2$ adsorption. More specifically, samples were characterized by $N_2$ adsorption at 77K using a gas sorption analyzer (obtained under the trade designation "MICROMERITICS;" Model ASAP-2020 from Micromeritics Instruments, Norcross, GA). Each specimen was outgassed for 24 hours at 573K to remove any moisture or adsorbed contaminants that may have been present on the surface. The mean pore diameter, Dp, was calculated from Dp=4Vt/S, where Vt is the total volume of pores at p/p0=0.99 (cc/g), and S being the BET surface area.

The results of this test for granules are represented in Table 4.

Total Solar Reflectivity (TSR)

Samples were measured for reflectivity using a spectrum reflectometer (obtained as Model SSR-ER v6 from Devices and Services Co., Dallas, TX) using a 1.5E air mass setting. Granules were loaded into a sample holder with a depth of approximately 5 millimeters (mm). The surface of the granules was leveled using a roller. For each sample, the average of three measurements are reported. Results of this study for the granules are represented in Table 3 as "Av. TSR".

L*, a*, b*

L*, a*, and b* color measurements were made using a Labscan XE spectrophotometer (Hunter Associates Laboratory, Reston, Va.) fitted with a sample holder and using a traversing roller to ensure that a uniformly level surface was prepared for measurement. The holder was filled to a depth of about 5 mm to ensure that the measured values were attributable to the granules. For a more detailed description of the sample holder and sample preparation refer to U.S. Pat. No. 4,582,425, which is herein incorporated by reference.

Tumble Toughness

Granule Tumble Toughness Values (wt. %) were determined using the Abrasion Resistance Test Roofing Procedure from the Asphalt Roofing Manufacturers Association (ARMA) Granule Test Procedures Manual, ARMA Form No. 441-REG-96, the disclosure of which is incorporated herein by reference. More specifically, a 125 gram sample was placed on the sieve shaker (obtained under the trade designation "RX-29 RO-TAP" from W.S. Tyler Industrial Group, Mentor, Ohio) and agitated for 10 minutes to ensure complete removal of the material finer than the mesh corresponding to the original diameter of the smallest fraction of the granules distribution (100 Mesh). 100 grams of the granules were weighted and placed them inside the 5.1 cm (2 inch) diameter pipe tester. The pipe was rotated by turning it end for end 100 times, controlling rate of rotation so that the granules drop cleanly without sliding. At the end of the test, the top cap was unscrewed, the pipe was turned over, the contents emptied into a nest of a 16 mesh sieve and a 30 mesh sieve, and the pan placed in the sieve shaker ("RO-TAP") and run for 5 minutes. All material that passed through the 30 mesh sieve was weighed, and the results of material that survived the test were reported as the percent by weight of total material that was retained in the 16 and 30 mesh sieves.

Preparatory Examples

Preparatory Example 1 (PE-1) Particles (granule cores) were made by casting and curing a slurry formulated according to Table 2 and crushing the cured material. First, a solid mixture of mineral fines, cement, and additives was homogenized in a mixer. Second, the solid mixture was combined with the water and plasticizer and stirred in a laboratory concrete mixer until the slurry was homogeneous in composition. The resulting slurry was cast into a 2 L mold. Curing was performed in the temperature range 20-25° C. in a closed chamber. After approximately 28 d of curing, blocks of cured material were removed from the molds, crushed, and sieved to obtain particle size distribution indicated in Table 3, below. BET area and pore volume are shown in Table 4.

TABLE 2

Slurry formulation
Components of slurry used to fabricate engineered particles, g

| | |
|---|---|
| White Portland Cement | 200 |
| Ca(OH)$_2$ | 50 |
| BG8 | 500 |
| BG8, 150-300 microns cut | 200 |
| AEROSIL 200 | 1 |
| Kaolinite RP2 | 50 |
| VISCOCRETE 2100 | 20 |
| Water | 230 |

TABLE 3

Engineered particle size distribution

| US sieve/nominal opening (mm) | Actual sample, weight % |
|---|---|
| 16/1.18-1.7 | 35.3 |
| 20/850-1.18 | 36.2 |
| 30/600-850 | 23.0 |
| 40/425-600 | 5.4 |
| Total | 100.0 |

TABLE 4

Textural properties of synthetic samples and standard roofing granules

| Sample ID | SSA, m$^2$/g | Total Pore Volume p/p$_0$ = 0.99 (cc/g) | Average Pore diameter/ (nm) |
|---|---|---|---|
| PE-1 | 29 | 0.05 | 40 |
| Grade #11 | <1 | <0.01 | 12 |

Examples

For Example 1 (EX-1), particles prepared as described for PE-1 were not coated before further measurements were made. For Examples 2 to 4 (EX-2 to EX-4), the slurry components indicated in Table 5 were combined in a vertical mixer. 1000 parts by weight of particles prepared as described for PE-1 were pre-heated to 90-95° C. and then combined with the amount of slurry indicated in Table 5 in a vertical or horizontal mixer. The slurry coated particles were then fired in a rotary kiln (natural gas/oxygen flame) reaching 460° C. over a period of approximately 10 minutes, thereby forming the granules. Following firing, the granules were allowed to cool to room temperature. Comparative Example 2 (CE-1) was 6580 and Comparative Example 3 (CE-2) was 4980.

EX-1, CE-2, and CE-3 were tested for tumble toughness. EX-1 through EX-4 and CE-1 through CE-2 were tested for L*, a*, b* and average TSR. The results are shown in Table 6.

TABLE 5

Pigment coating components

| Component (g) | EX-1 | EX-2 | EX-3 | EX-4 |
|---|---|---|---|---|
| Water | 0 | 20 | 30 | 15 |
| Sodium Silicate | 0 | 65 | 97.5 | 40 |
| BROWN 10550 | 0 | 0 | 0 | 1.1 |
| YELLOW 10415 | 0 | 0 | 0 | 5.5 |
| RED V13810 | 0 | 0 | 0 | 0.6 |
| Shepherd 30C940 | 0 | 16 | 24 | 0 |
| RP2 Clay | 0 | 30 | 45 | 15 |

TABLE 6

Properties of Engineered Granules and Comparative Granules

| Example or Comparative Example | Tumble toughness, wt. % survived | L* | a* | b* | Av. TSR |
|---|---|---|---|---|---|
| EX-1 | >0.99 | 68.76 | −0.61 | 2.28 | 0.378 |
| EX-2 | NM | 37.71 | 0.15 | −2.73 | 0.225 |
| EX-3 | NM | 27.14 | 0.7 | −0.8 | 0.177 |
| EX-4 | NM | 57.27 | 5.91 | 12.59 | 0.321 |
| CE-1 | >0.99 | 58.01 | 7.63 | 19.31 | 0.31 |
| CE-2 | >0.99 | 63.54 | 3.88 | 15.12 | 0.35 |

"NM" = not measured

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A plurality of non-white roofing granules comprising:
   a) a plurality of particles comprising mineral fines and a calcia-based cement binder, wherein the mineral fines comprise igneous or metamorphic rock, wherein the calcia-based cement binder comprises Portland cement; and
   b) a non-white pigment-containing coating disposed on at least a portion of exterior surfaces of the plurality of particles.

2. The plurality of non-white roofing granules of claim 1, wherein the non-white pigment-containing coating is disposed on greater than 50% of the exterior surfaces of the plurality of particles.

3. The plurality of non-white roofing granules of claim 1, wherein the calcia-based cement binder further comprises a calcium silicate, a calcium phosphate, a calcium aluminate, or a combination thereof.

4. The plurality of non-white roofing granules of claim 1, wherein the mineral fines comprise at least one of nepheline syenite, dacite, rhyolite, andesite, basalt, granite, diabase, or diorite.

5. The plurality of non-white roofing granules of claim 1, wherein at least a portion of the plurality of non-white roofing granules are free of any coating that comprises titania.

6. The plurality of non-white roofing granules of claim 1, wherein each non-white roofing granule comprises 50 to 80 percent by weight of the mineral fines, based on the total weight of each non-white roofing granule.

7. The plurality of non-white roofing granules of claim 1, wherein each non-white roofing granule comprises 5 to 40 percent by weight of the calcia-based cement binder, based on the total weight of each non-white roofing granule.

8. The plurality of non-white roofing granules of claim 1, wherein each non-white roofing granule collectively comprises at least 80 percent by weight collectively of the mineral fines and the calcia-based cement binder.

9. The plurality of non-white roofing granules of claim 1, wherein each of the plurality of particles further comprises a pigment disposed within the particle.

10. The plurality of non-white roofing granules of claim 1, wherein each of the plurality of particles further comprises 0.1 to 10 percent by weight of at least one rheology, durability- and/or aqueous stability-improving additive, based on the total weight of each particle.

11. The plurality of non-white roofing granules of claim 1, exhibiting an intrinsic total solar reflectance (TSR) of 0.15 or greater, 0.20 or greater, 0.25 or greater, 0.30 or greater, or 0.35 or greater; and 0.60 or less, 0.55 or less, 0.50 or less, 0.45 or less, or 0.40 or less.

12. The plurality of non-white roofing granules of claim 1, wherein the plurality of non-white roofing granules has an average total pore volume in a range from 0.10 cubic centimeter per gram (cc/g) to 0.40 cc/g.

13. The plurality of non-white roofing granules of claim 1, exhibiting an average total diffuse reflectance (L*) of less than 60 and an intrinsic total solar reflectance (TSR) of greater than 0.30.

14. The plurality of non-white roofing granules of claim 1, having particle sizes in a range from 100 micrometers to 5 millimeters, wherein the particles comprise particle sizes in a range from 90 micrometers to 4.9 millimeters.

15. The plurality of non-white roofing granules of claim 1, wherein the non-white pigment-containing coating comprises a solar-reflective pigment.

16. A method of making the plurality of non-white roofing granules of claim 1, the method comprising: mixing material comprising the mineral fines and the calcia-based cement binder to provide agglomerates comprising the mineral fines and the calcia-based cement binder; curing the agglomerates to provide a plurality of particles; and coating at least a portion of exterior surfaces of the plurality of particles with a non-white pigment-containing coating.

17. A method of making the plurality of roofing granules of claim 1, the method comprising: providing an aqueous dispersion in a tool comprising a plurality of cavities, the aqueous dispersion comprising the mineral fines and the calcia-based cement binder; curing the aqueous dispersion in the tool to provide a plurality of particles; and coating at least a portion of exterior surfaces of the plurality of particles with a non-white pigment-containing coating.

* * * * *